United States Patent [19]

Kasper et al.

[11] Patent Number: 4,612,081

[45] Date of Patent: Sep. 16, 1986

[54] PRESSURE EQUALIZING PAD FOR HEATED PLATE PRESSES

[75] Inventors: Rolf Kasper, Leimen; Friedrich B. Bielfeldt, Eppingen, both of Fed. Rep. of Germany

[73] Assignee: Maschinenfabrik J. Dieffenbacher GmbH & Co., Eppingen, Fed. Rep. of Germany

[21] Appl. No.: 765,220

[22] Filed: Aug. 13, 1985

[30] Foreign Application Priority Data

Aug. 13, 1984 [DE] Fed. Rep. of Germany ....... 3429801

[51] Int. Cl.[4] ................................ B29C 3/00

[52] U.S. Cl. ................................ 156/583.1; 425/407

[58] Field of Search .................... 425/405 H, 406, 407, 425/810, DIG. 246, 78; 156/251, 252, 583.1; 100/255

[56] References Cited

U.S. PATENT DOCUMENTS

| | | | |
|---|---|---|---|
| 1,269,060 | 6/1918 | Davenport | 425/407 |
| 1,326,330 | 12/1919 | Edison | 425/810 X |
| 1,576,642 | 3/1926 | Bishop | 425/810 X |
| 3,200,442 | 8/1965 | Haller | 425/78 |
| 3,918,875 | 11/1975 | Phillipson et al. | 425/810 |
| 3,932,097 | 1/1976 | Press | 425/407 |
| 3,998,580 | 12/1976 | Pffiffer | 425/407 |
| 4,018,552 | 4/1977 | Prast et al. | 425/407 |
| 4,053,276 | 10/1977 | Ahweiler et al. | 425/406 |
| 4,557,792 | 12/1985 | Yamada et al. | 156/583.1 |

*Primary Examiner*—J. Howard Flint, Jr.

*Attorney, Agent, or Firm*—Schwartz, Jeffery, Schwaab, Mack, Blumenthal & Evans

[57] ABSTRACT

A pressure equalizing pad for presses with heated plates for the production of compacts, laminates, etc. has a press stand with a movable ram. An upper pressure plate is attached to the ram and a bed-pressure plate is positioned on a press bed with a hydrostatic pressure pad thereon. The hydrostatic pressure pad includes a thin steel sheet floatingly maintained by an oil medium, a flexible edge seal between the steel sheet and the bed-pressure plate, as well as rings and gaskets to form the improved device.

11 Claims, 4 Drawing Figures

PRESSURE EQUALIZING PAD FOR HEATED PLATE PRESSES

FIELD OF THE INVENTION

The invention relates to a pressure equalizing pad for presses with heated plates for the production of compacts, laminates and the hardening of wood chip plates.

PRIOR ART

Pressure equalizing pads serve to equalize the molding pressure during the pressing process and to reduce the wear of expensive pressure plates, i.e., structural and polished plates. In the pressing of thin laminated plates, synthetic plastic laminates of all types and the hardening of composite wood plates, which must satisfy high requirements in relation to dimensional tolerances and surface quality, surface defects appear in the finished, pressed material. These disadvantages are caused by pressure differences within the pressing surface generated by unevennesses of the pressure plates, the press plates and/or the material being pressed itself.

The known pressure equalizing pads used in multistage or single stage heated plate presses consist of cotton and/or asbestos fiber fabrics with or without metal wires woven into them, kraft papers in several layers or rubber mats. While their pressure equalizing effect is good, these pressure equalizing pads are of low efficiency in relation to their thermal conductivity, i.e., there is the disadvantage that there is an appreciable loss of heat capacity between the press plates and the material being pressed.

In the aforementioned types of pressing methods heat is introduced into the material being pressed, and this heat must be continuously supplied by the heated pressure plates through the pressure equalizing pad and the press plates. In view of the heat braking effect of the known pressure equalizing pads, not enough heat can be supplied. Therefore, the temperature in the material being pressed is reduced and the pressing process must be extended, or higher temperatures must be provided in the press plates. In order to compensate for this disadvantage, it is preferred to raise the temperature in the heated pressure plates. However, the rise of temperature in the press to shorten the pressing cycle is strictly limited.

A further disadvantage of the aforementioned pressure equalizing pads is their short service life. In particular, during the pressing of laminate plates with extraordinarily narrow dimensional tolerances even after a short period of use, permanent differences exist over the entire surface, but primarily in the peripheral areas. Thus, the original accuracy requirements can no longer be observed in subsequent pressing cycles and the pressure equalizing pads must be replaced.

OBJECTS AND SUMMARY OF THE INVENTION

It is an object of the invention to provide a pressure equalizing pad with good thermal conductivity, capable of satisfactorily equalizing existing inaccuracies within the pressing space without creating detrimental effects on the surface quality of the finished material even in the case of narrow dimensional tolerances and with a significantly longer service life.

This object is attained according to the invention by the development of the pressing surface into a hydrostatic pressure pad, wherein a thin steel sheet is floatingly maintained by a medium and a flexible edge seal over the press platen-pressure plate.

According to the invention, an elastic pressure surface is built on the press platen-pressure plate, which independently of the different thicknesses of the material being pressed and the unevennesses of the pressure plates and press plates, insures the elastic deformation of the material during the pressing process. Surface defects originating in the pressure equalizing pad can no longer occur. The result is an improved pressure compensation. A further advantage is that there is no heat loss in the conduction of heat between the press plate and the material being pressed, as preferably oil is used as the medium in the hydrostatic pressure pad, which together with a thin steel sheet is capable of assuming the temperature of the press plate, thus having a high thermal conductivity. It is further of advantage that there are no parts or materials exposed to wear which are capable of affecting the surface quality of the material being pressed in the pressure equalizing pad according to the invention, and that thus its service life is significantly longer than that of conventional pressure compensating pads.

A pressure equalizing pad for presses with heated plates for the production of compacts, laminates, etc. has a press stand with a movable ram. An upper pressure plate is attached to the ram and a bed-pressure plate is positioned on a press bed with a hydrostatic pressure pad thereon. The hydrostatic pressure pad includes a thin steel sheet floatingly maintained by an oil medium, a flexible edge seal between the steel sheet and the bed-pressure plate, as well as rings and gaskets to form the improved device.

BRIEF DESCRIPTION OF THE DRAWINGS

Further advantages of the invention will become more apparent from the following description when taken with reference to the accompanying drawings, wherein.

DETAILED DESCRIPTION OF THE INVENTION

Figure 1:
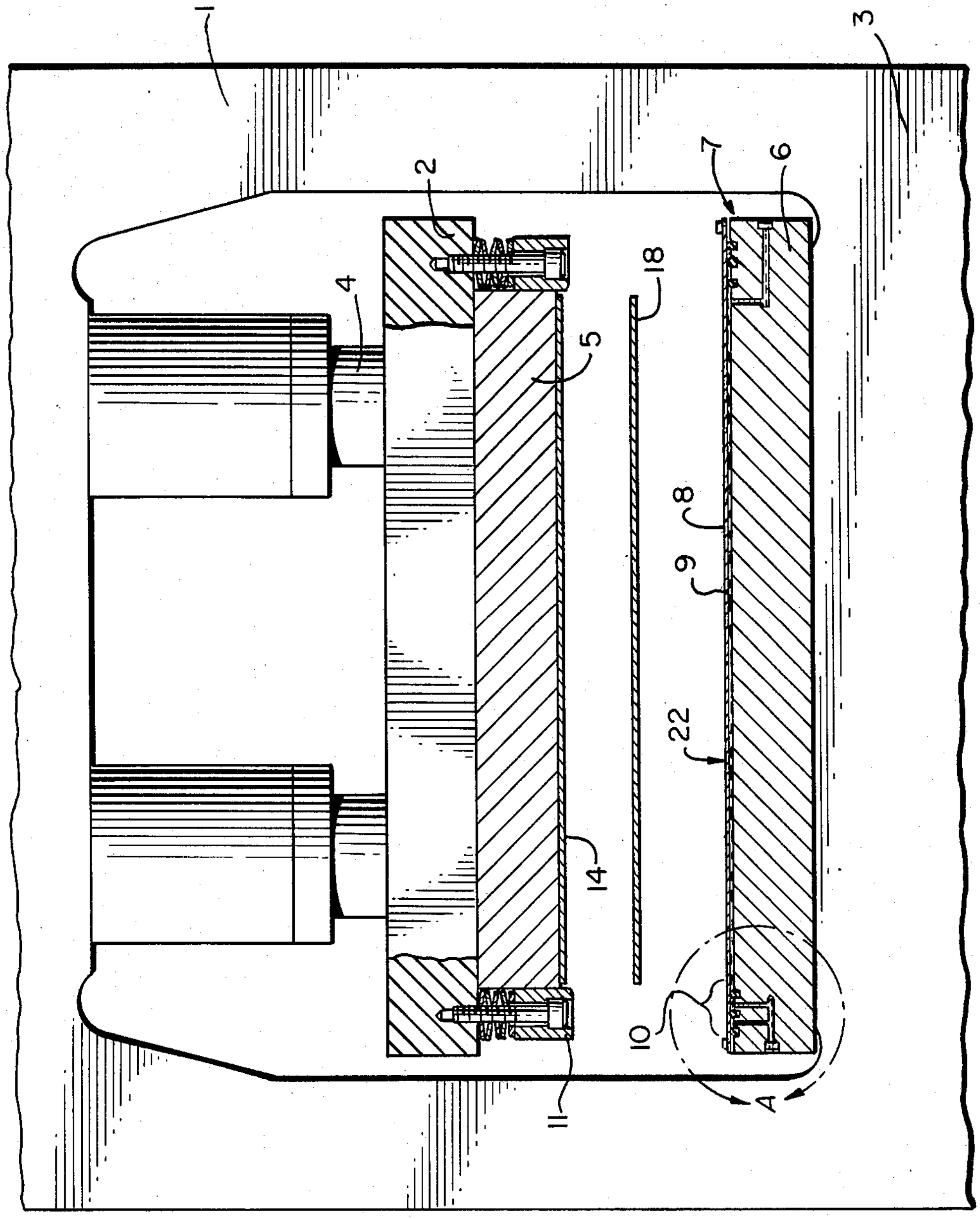
FIG. 1 is an elevation view, partially in section, of a heated plate press with the pressure compensating pad according to the invention.

The heated plate press shown in FIG. 1 consists of a press stand 1, a movable ram 2, a stationary press bed 3 and a plurality of pressure cylinder piston assemblies 4. An upper pressure plate 5 with an upper press plate 14 is attahced to the ram 2, while a press bed-press plate 6, together with a hydrostatic pressure equalizing pad 7 according to the invention, is associated with the press bed 3. The hydrostatic pressure equalizing pad 7 also serves as a press surface 22 for the deposition of material 18 to be pressed and consists of a cavity 9 preferably filled with oil, defined on top by a steel sheet 8.

Figure 2:
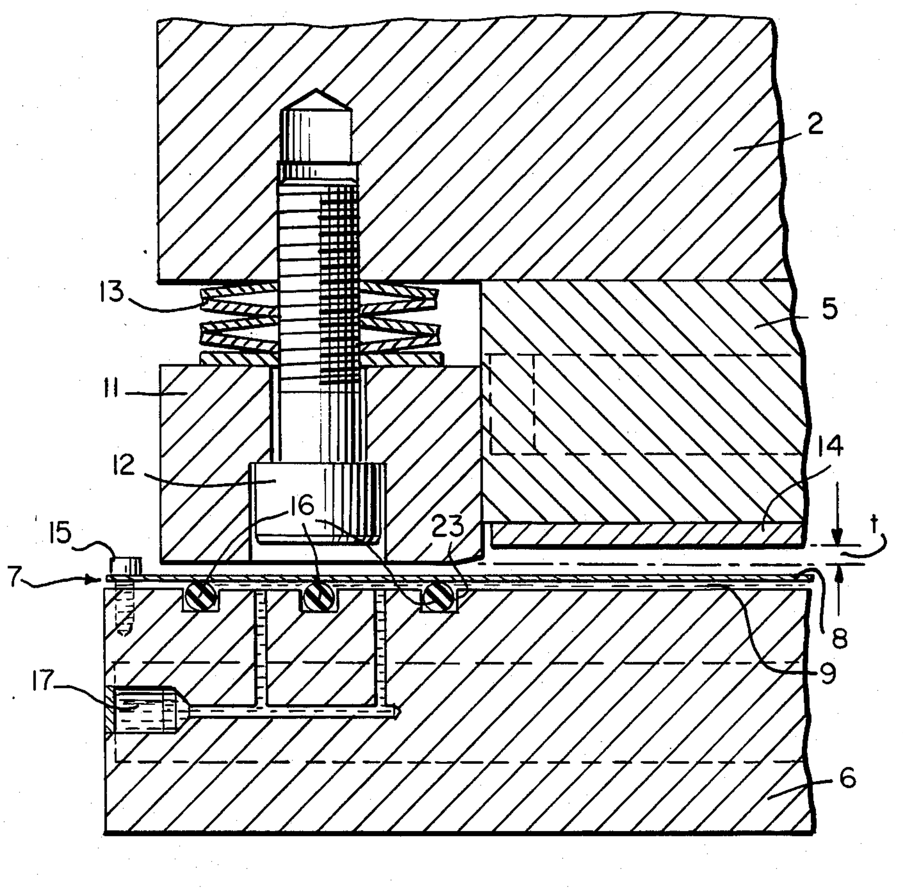
FIG. 2 is a sectional view of detail A of FIG. 1, enlarged.

An edge seal 10 for the cavity, as seen in detail in FIG. 2, has three rubber rings 16 placed in three corresponding grooves 23 in the press bed-pressure plate 6. To immobilize the steel sheet 8 and the rubber rings 16, the steel sheet 8 is pressured at the outermost edge of the press bed-pressure plate 6 by a plurality of screws 15. To introduce the medium 9, a plurality of feeder channels 17 are provided in the press bed-press plate 6. In actual operation, it is appropriate to connect a vacuum pump here in order to suction off any potential oil leaks.

Figure 3:
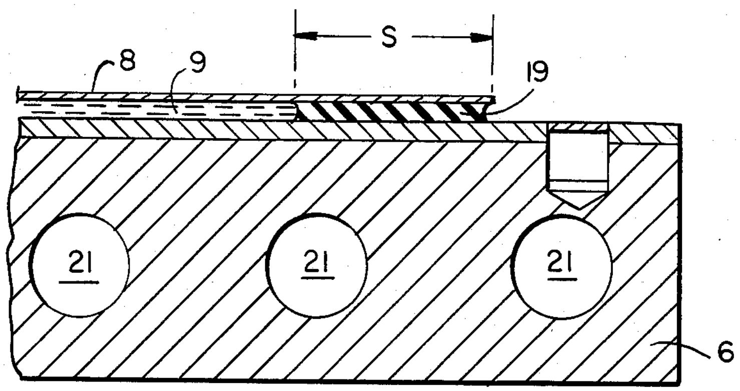
FIG. 3 is a sectional view of the pressure compensating pad with edge sealing.

As shown in FIG. 3, the edge sealing of the cavity is effected in a further development of the invention by a flat rubber gasket 19. The flat rubber gasket 19 is dimensioned in its width S in keeping with the highest compacting pressure of the heated plate press and is vulcanized to the press bed-pressure plate 6 and the steel sheet 8. During the vulcanizing process the cavity between the steel sheet 8 and the pressure plate 6 is placed under an air pressure of approximately a 10 meter water column, so that the bulging of the large surface, for example in the case of a hydrostatic pressure pad 7 of 5×2 m, is prevented. Following the vulcanizing, the air is blown out through steel conduits placed laterally in the flat rubber, and subsequently oil 9 is introduced by means of a vacuum.

A further advantageous measure according to the invention consists of supporting the edge seal of the hydrostatic pressure pad 7 mechanically by a press frame 11 on the ram 2, preceding the compacting pressure. For this purpose, the press frame 11 surrounding the upper pressure plate 5 is provided, which projects past the upper press plate 14 by a measure t and which at the onset of the pressing process is the first to contact the steel sheet 8. In this manner, the force of the seal at the edge of the pressure equalizing pad 7 is continuously reinforced by the buildup of the compacting pressure. The press frame 11 is mounted on the ram 2 by means of a plurality of flat springs 13 and corresponding screws 12.

Figure 4:
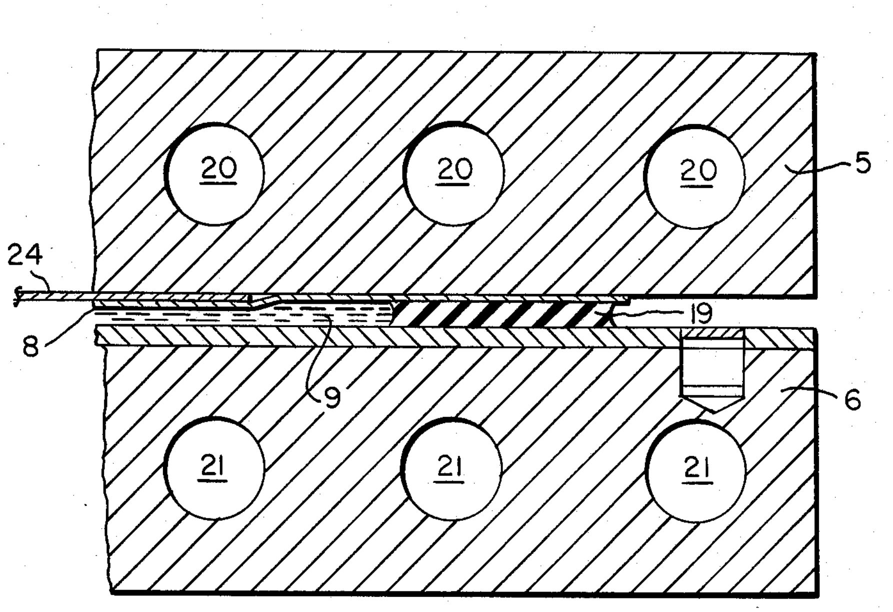
FIG. 4 is a sectional view of the pressure compensating pad during the pressing process.

FIG. 4 shows a pressing process with the pressure equalizing pad according to the invention. Upon the closing of the press, the material to be pressed, in this case a laminate 24, is placed flat between the ram 5 and the steel sheet 8 of the hydrostatic pressure pad 7, whereby the entire surface of the laminate 24 is covered, so that for example at a specific compacting pressure of approximately 100 kp/cm$^2$, this pressure is acting everywhere and uniformly on the surface of the laminate. The amount of heat introduced into the heating channels 20 and 21 of the pressure plates 5 and 6 is transferred in the shortest possible period of time by means of the oil medium and the steel sheet to the material to be pressed.

While one embodiment of the invention has been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A pressure equalizing pad for heated plate presses and the like, comprising:

(a) a press stand having a movable ram thereon;

(b) a stationary press bed on said stand;

(c) an upper pressure plate attached to said ram, and a bed-pressure plate positioned on said press bed; and (d) a hydrostatic pressure pad positioned on said bed-pressure plate.

2. The pad of claim 1 wherein said hydrostatic pressure pad includes a thin metal sheet floatingly maintained by a medium.

3. The pad of claim 2 including a flexible edge seal between said metal sheet and said bed-pressure plate.

4. The pad of claim 3 wherein said seal comprises at least two grooves in said bed-pressure plate and a rubber ring in each of said grooves, said rings being held in said grooves by said metal sheet.

5. The pad of claim 4 wherein said metal plate is pressured by means of a plurality of screws against said bed-pressure plate and wherein the thickness of said hydrostatic pressure pad is formed by the thickness of said rings.

6. The pad of claim 2 wherein said metal plate is steel.

7. The pad of claim 2 wherein said metal plate is vulcanized along its peripheral edge to said bed-pressure plate by means of an endless flat rubber gasket.

8. The pad of claim 7 wherein the width of said gasket is dimensioned in accordance with the compacting pressure of the heated plate press.

9. The pad of claim 1 including a pressure frame mounted on said ram, said pressure frame surrounding said upper pressure plate; an upper press plate elastically mounted on said upper pressure plate and wherein said upper pressure frame projects over said upper press plate a given distance.

10. The pad of claim 1 including a plurality of heating channels in at least one of said plates, feeder channels connected to said heating channels, and a vacuum pump connected to said feeder channels.

11. The pad of claim 2 wherein said medium is oil.

* * * * *